United States Patent [19]

Yaworski et al.

[11] Patent Number: 5,606,149

[45] Date of Patent: Feb. 25, 1997

[54] CLOSURE FOR HIGH VOLTAGE CABLE CONNECTIONS HAVING AN INSULATING GEL TO FORM GEL TO GEL INTERFACE WITH OTHER INSULATING GEL

[75] Inventors: Harry G. Yaworski, Newark, Del.; Graham J. Clarke, Chads Ford, Pa.; Wolfgang B. Haverkamp, Glonn; Pascal LeCordier, Munich, both of Germany; James E. Jervis, Atherton; Brian H. Clark, Brisbane, both of Calif.

[73] Assignee: Raychem Corporation, Menlo Park, Calif.

[21] Appl. No.: 322,822

[22] Filed: Oct. 13, 1994

Related U.S. Application Data

[63] Continuation-in-part of Ser. No. 138,360, Oct. 18, 1993, abandoned.

[51] Int. Cl.⁶ .................................................. H02G 15/113
[52] U.S. Cl. .......................................... 174/92; 174/84 R
[58] Field of Search .................................. 174/92, 84 R, 174/102 R, 102 SC, 73 R

[56] References Cited

U.S. PATENT DOCUMENTS

| | | | |
|---|---|---|---|
| 3,879,575 | 4/1975 | Dobbin et al. | 174/92 |
| 4,238,639 | 12/1980 | Palmieri | 174/73 R |
| 4,314,093 | 2/1982 | Eldridge | 174/73 R |
| 4,477,376 | 10/1984 | Gold | 252/572 |
| 4,589,939 | 5/1986 | Mohebban et al. | 156/49 |
| 4,629,277 | 12/1986 | Boettcher et al. | 339/111 |
| 4,698,458 | 10/1987 | Parmigiani | 174/73 R |
| 4,736,071 | 4/1988 | Hawkins et al. | 174/92 |
| 4,740,653 | 4/1988 | Hellbusch | 174/21 R |
| 4,742,184 | 5/1988 | Courty | 174/73 R |
| 4,758,171 | 7/1988 | Hey | 439/181 |
| 4,770,641 | 9/1988 | Rowlette | 439/86 |
| 4,845,457 | 7/1989 | Nakanishi | 338/114 |
| 4,849,580 | 7/1989 | Reuter | 174/92 |
| 4,859,809 | 8/1989 | Jervis | 174/92 |
| 4,863,535 | 9/1989 | More | 156/49 |
| 4,877,943 | 10/1989 | Oiwa | 219/538 |
| 4,909,756 | 3/1990 | Jervis | 439/521 |
| 4,943,685 | 7/1990 | Reynsert | 174/19 |
| 4,963,698 | 10/1990 | Chang et al. | 174/77 R |
| 5,099,088 | 3/1992 | Usami et al. | 174/76 |
| 5,114,357 | 5/1992 | Luzzi | 439/183 |
| 5,173,573 | 12/1992 | Jervis | 174/138 F |
| 5,182,050 | 1/1993 | Joyce, Jr. et al. | 252/500 |
| 5,462,213 | 10/1995 | Watt | 224/155 |
| 5,462,295 | 10/1995 | Seltzer | 280/11.19 |

FOREIGN PATENT DOCUMENTS

| | | | |
|---|---|---|---|
| 0147979A1 | 7/1985 | European Pat. Off. | H01R 13/53 |
| 0174165A1 | 3/1986 | European Pat. Off. | H01B 1/20 |
| 0409444A2 | 1/1991 | European Pat. Off. | H02G 15/18 |
| WO93/05113 | 3/1983 | WIPO | C08L 53/00 |
| WO86/01634 | 3/1986 | WIPO | H01B 7/18 |
| WO86/02210 | 4/1986 | WIPO | H02G 15/184 |
| WO92/22116 | 12/1992 | WIPO | H02G 15/18 |

OTHER PUBLICATIONS

Fournier et al., "Interfacial breakdown phenomena between two EPDM surfaces," Pub. No. 363, 6th IEE Conf. on Dielectric Materials, Measurements, and Applications, pp. 330–333, Manchester, U.K., Sep. 1992.

Hayashi et al., "Developments of prefabricated joints for 154 kV XLPE cable," Proceed. of the Jicable 91 Int'l Conf., Versailles, France, pp. 99–105 (1991).

Tanaka, "Development of prefabricated type straight through joint for 275 kV cable," Paper presented at IEEE/PES T&D, Dallas, Texas, pp. 243–249 (Sep. 1991).

*Primary Examiner*—Leo P. Picard
*Assistant Examiner*—Jayprakash N. Gandhi
*Attorney, Agent, or Firm*—Herbert G. Burkard; Yuan Chao

[57] ABSTRACT

A closure is provided for connections between high voltage cables and other electrical equipment, such as another high voltage cable, a transformer, or switch gear. Insulation is provided by an insulating gel which forms interfaces with itself and/or materials of the cable or other electrical equipment. The interfaces have a high interfacial dielectric strength, which prevents failure along the interfaces.

52 Claims, 8 Drawing Sheets

CLOSURE FOR HIGH VOLTAGE CABLE CONNECTIONS HAVING AN INSULATING GEL TO FORM GEL TO GEL INTERFACE WITH OTHER INSULATING GEL

CROSS-REFERENCE TO RELATED APPLICATIONS

This application is a continuation-in-part of application Ser. No. 08/138,360, filed Oct. 18, 1993, now abandoned, the disclosure of which is incorporated herein by reference.

TECHNICAL FIELD OF THE INVENTION

This invention relates to the protection of a connection between two pieces of high voltage electrical equipment, especially between a power cable and other electrical equipment.

BACKGROUND OF THE INVENTION

The requirements for a joint protecting a connection between a power cable (such as those used in transmission and distribution networks) and another cable or other electrical equipment, such as switch gear or a transformer, are more demanding than those for joint protecting a signal (e.g., telephone) cable connection. This is especially true with high voltage power cables. (Generally, "high voltage" denotes voltages above 1 kV, with the subrange of 1–69 kV being referred to herein as "medium voltage.") In both instances, a good seal which protects the conductors from moisture, dust, and other environmental contaminants is essential. However, in a signal cable joint, the dielectric strength of the insulation is not critical, provided it is a good insulator. With a high voltage cable joint, the insulation must resist dielectric breakdown at the much higher voltage stresses encountered. Also, power equipment operates at higher temperatures than telephone or other signal cables, so high temperature stability is needed. Finally, electrical stress must be controlled by appropriate design of the closure or by placement of stress grading material at critical locations to distribute the stress. (Herein, references to "conductive," "conductivity," and "stress" are to be construed in the electrical context, unless indicated otherwise.)

A common design for high and low voltage joints has a tubular outer protective component. The component is slid over one of the cable ends, temporarily "parked" next to the connection area, and then slid over the connection area after completion of the conductor splicing operation. This approach necessitates extra working area at least equal to the length of the joint itself. As the splicing may take place in cramped quarters, the additional space may be unavailable. For high voltage power cables, with typically longer joints, this problem is accentuated.

An alternative design employed with signal cables closures has two half shells, each pre-filled with a void-filling material. The two half shells are fitted together over the connection, with the void-filling material encapsulating the connection and cables. This design is attractive because it does not have any components which must be slid off to a side and environmental sealing is achieved by simply mating the two halves together. Many examples exist in the low-voltage area, for example Dobbin et al., U.S. Pat. No. 3,879,575 (1975); Reuter, U.S. Pat. No. 4,849,580 (1989); Jervis, U.S. Pat. No. 4,859,809 (1989); Jervis, U.S. Pat. No. 4,909,756 (1990); Usami et al., U.S. Pat. No. 5,099,088 (1992); and Jervis, U.S. Pat. No. 5,173,173 (1992). However, this design has not been used in the high voltage area because the interface between the void-filling material in the two shells can provide a path through which dielectric failure can readily occur. It has been reported that the interfacial dielectric strength between two pieces of the same material is about one-sixth the bulk dielectric strength of material itself. Fournier et al., "Interfacial breakdown phenomena between two EPDM surfaces," Pub. No. 363, 6th IEE Conference on Dielectric Materials, Measurements, and Applications, pp. 330–333 (Sep. 1992, Manchester, U. Kingdom). It has also been reported that dielectric breakdown by tracking at interfaces accounts for about 40% of the failures in medium voltage cable splices. Lamarre et al., "Characterization of medium voltage cable splices aged in service," Proceedings of the Jicable 91 International Conference, Versailles, France, pp. 298–304 (Jun. 1991). Further, low voltage pre-filled half-shell closures are unsuitable for high voltage applications because they make no provision for controlling stress.

Where the half-shell design has been employed in the prior art for high voltage joints, pre-filling has been avoided: unfilled half-shells are positioned around a connection and an encapsulant (e.g., a polyurethane or bitumen) is poured in through a vent and allowed to set. In this "cast-resin" approach the encapsulant sets as a single mass, avoiding the creation of an interface within the encapsulant along which failure can occur. See, for example, Reynaert, U.S. Pat. No. 4,943,685 (1990). However, the joint cannot be inspected, tested, or buried, nor the cable energized, until after the encapsulant has set—which may be an extended period of time. Also, cast resin closures are normally not re-enterable.

Thus, it is desirable to provide a closure for high voltage connections overcoming the foregoing limitations, which employs a pre-cured void filling material which is not susceptible to interfacial dielectric failure.

SUMMARY OF THE INVENTION

A closure of this invention employs a gel as the void-filling material. We have unexpectedly discovered that a gel has an interfacial dielectric strength which is at least 40% of the dielectric strength of the bulk gel itself. For example, a joint of this invention contains a gel-gel interface having an interfacial dielectric strength of at least 10 kV/mm, compared to EPDM-EPDM interfacial dielectric strengths of less than about 3 kV/mm. Likewise, the interface between the gel and the cable materials also has a high interfacial dielectric strength, enabling a reduction in the longitudinal interfaces and in the overall length of the joint. This discovery makes possible a compact, conveniently installed, half-shell type high voltage closure. Because the gel may be parted at the interface, re-entry may be possible. The closures are suitable for protecting connections between two pieces of high voltage electrical equipment, especially where at least one of the pieces is a medium voltage cable, such as a distribution or transportation cable. The insulating gel is already set, that is, already is in substantially its final gel form when applied over a cable connection, thereby eliminating the need for in situ mixing and pouring and waiting for the gel to cure.

Accordingly, there is provided a closure arrangement for protecting a connection between two pieces of high voltage electrical equipment, comprising (a) a housing adapted to fitting over the connection and having a conductive surface for providing an electrically neutral shield for the connection and the portions of the electrical equipment contained therein;

(b) electrical stress control means adapted to surrounding the connection and the portions of the electrical equipment immediately adjacent thereto, to control the distribution of electrical stress; and (c) an insulating gel adheringly disposed within the housing inside of the conductive surface and adapted to making close and conforming contact with the electrical stress control means and the portions of the electrical equipment contained within the housing, such that substantially all voids therewithin which are not surrounded by the electrical stress control means are filled when the housing is fitted over the connection.

Preferably, at least one of the pieces of high voltage electrical equipment is a high voltage power cable. Optionally, the housing may further have an insulating layer disposed on the interior thereof, between the conductive material and the insulating gel.

The housing may have a single-piece wrap-around construction. Or, at least two shells may be adapted to fitting together to form the housing. The housing (or corresponding shells) may be at least partially pre-filled with insulating gel, thereby avoiding trapping air voids between the insulating gel and the housing. By "pre-filled," it is meant that the insulating gel, substantially in its set state, is adheringly positioned inside the housing or shells before its application onto the connection, so that no air is trapped between the housing and the gel. A gel may set by a chemical curing reaction, as in the case of chemically cross-linked gels, or simply by cooling, in the case of thermoplastic gels. Optionally, the housing may further have an insulating layer disposed on the interior thereof, between the conductive material and the insulating gel.

The closure may further comprise a force means for acting in combination with the housing for forcing the insulating gel into close and conforming contact with the electrical stress control means, the portions of the cable and other electrical equipment contained within the housing, and other insulating gel. Where the housing is of the fitted-together, gel-filled shells type, a gel-to-gel interface is formed between the insulating gel of one shell and the insulating gel of another shell. Where the housing is of a pre-filled, single piece construction, the gel-to-gel interface may be between two portions of insulating gel forming part of a single volume of insulating gel filling the housing. Thus, a reference herein to an interface between the insulating gel and "other insulating gel" should not be construed as implying the mandatory presence of at least two separate volumes of insulating gel. The force means may also act in combination with the housing after installation to keep the insulating gel under compression, to preserve the close and conforming contacts.

In another aspect of the invention, there is provided a joint between a high voltage power cable and other electrical equipment, the cable comprising at least one core conductor, an insulation surrounding each core conductor, and a semiconducting layer surrounding the insulated core conductors, wherein
(a) a connection is formed between an exposed conductor of a stripped core of the cable and an exposed conductor of the other electrical equipment by means of a connector;
(b) an electrical stress control means surrounds the connection and the portions of the cable and the other electrical equipment immediately adjacent thereto to control the distribution of electrical stress;
(c) a housing encompasses the connection and electrical stress control means, the housing having a conductive surface which is electrically connected to the semiconducting layers of the cable and the other electrical equipment to provide an electrically neutral shield for the joint; and
(d) the interior of the housing is filled with at least an insulating gel which forms at least one gel-to-gel interface with other insulating gel, the interface having an interfacial dielectric strength of at least 40%, preferably at least 60%, and more preferably at least 80%, of the bulk dielectric strength of the insulating gel and the insulating gel being disposed within the electrically neutral shield and in close and conforming contact with the interior of the housing, the electrical stress control means and the portions of the cable and the other electrical equipment contained within the housing.

In yet another aspect of the invention, there is provided a method of making a joint between a high voltage cable and other electrical equipment, the cable comprising at least one core conductor, an insulation surrounding each core conductor, and a semiconducting layer surrounding the insulated core conductors, comprising the steps of:
(a) stripping back the semiconducting layer and the insulation of the cable in a terraced arrangement to expose a portion of the insulation and the conductor;
(b) forming a connection between the exposed cable conductor and an exposed conductor of the other electrical equipment with a connector;
(c) surrounding the connection and the portions of the cable and the other electrical equipment immediately adjacent thereto with an electrical stress control means to control the distribution of electrical stress; and
(d) positioning over the connector a housing having a conductive surface and further having an insulating gel adheringly disposed on the interior thereof inside of the conductive layer, such that the insulating gel is in close and conforming contact with the electrical stress control means and the portions of the electrical equipment within the housing; substantially all voids within the housing which are not surrounded by the electrical stress control means are filled; and the conductive surface forms an electrically neutral shield for the connection.

DESCRIPTION OF THE PREFERRED EMBODIMENTS

The closure of this invention is suitable for making joints between many kinds of high voltage cables, for example crosslinked polyethylene (XLPE), ethylene-propylene rubber (EPR), and paper-insulated lead (PILC) cables. It will accommodate the connections of the concentric neutral, copper tape, or wire shields of the cable which need to be connected over the joint in order to continue the ground shield. The closure is also suitable for connecting a high voltage power cable another power cable, or, via a bushing, to switch gear or a transformer.

Figure 1A:
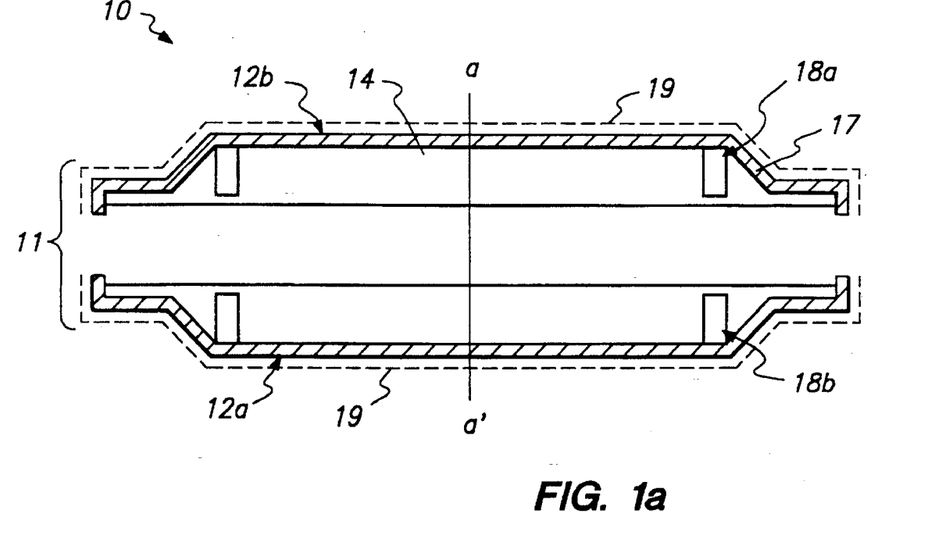
FIG. 1a–b are different views of a closure of this invention.

FIG. 1a depicts, in a longitudinal cross-sectional view, a closure 10 comprising first and second elongate shells 12a and 12b which may be but are not necessarily identical. Shells 12a and 12b are filled with an insulating gel 14 and are adapted to fitting together to form a housing 11. Optional stabilization rings 18a and 18b, made of an insulating material, serve as spacers to hold the closure in place when installed. Rings 18a and 18b also serve as spacer means for ensuring that insulating gel 14 is distributed around the joint in a minimum predetermined thickness and that it is not inadvertently squeezed so as to be too thin to provide the necessary dielectric strength. Rings 18a–b may be integral with the respective shells 12a or 12b, or detached therefrom. In an alternative configuration, they may be in the form of longitudinal baffles.

Shells 12a and 12b have a conductive (or at least semi-conductive) surface 19 which forms an electrical contact with the semiconducting layer of the cable and, if present, the semiconducting layer of the other electrical equipment, to form an electrically neutral surface for the joint. Shells 12a and 12b may be made of metal or polymer rendered conductive by filling with conductive material such as carbon black, graphite, or metal powder or flakes, in which case the conductive material forms both the body of the housing and conductive outer surface 19. Generally, the resistivity of conductive surface 19 preferably is less than 500 ohm-cm and typically is between 100 and 1000 ohm-cm. Where shells 12a–b are made of metal, they may be stamped. Where shells 12a–b made of polymer, they may be blow or injection molded or vacuum formed. Shells 12a–b may include an optional stress-relief cone 17, which tapers in the direction leading away from the center of the closure. In addition to providing electrical stress relief, shells 12a and 12b provide mechanical protection for the enclosed joint. Therefore, they should be relatively rigid and crush-resistant. Optionally, shells 12a–b may be made of an elastomeric material to accommodate expansion of the gel.

Alternatively, shells 12a and 12b may comprise insulating material, with conductive outer surface 19 being provided by a thin layer of metal other conductive material sprayed, painted, or otherwise deposited thereon. Conductive surface 19 may be the outer surface or skin of shells 12a and 12b, as shown here, or there may be an additional layer of dielectric material over it. Or, shells 12a–b may comprise two layers of polymeric material, an insulating inner layer and a conductive outer one, which are laminated or bonded to each other in a void-free manner. The positions of these two layers also may be reversed.

Figure 1B:
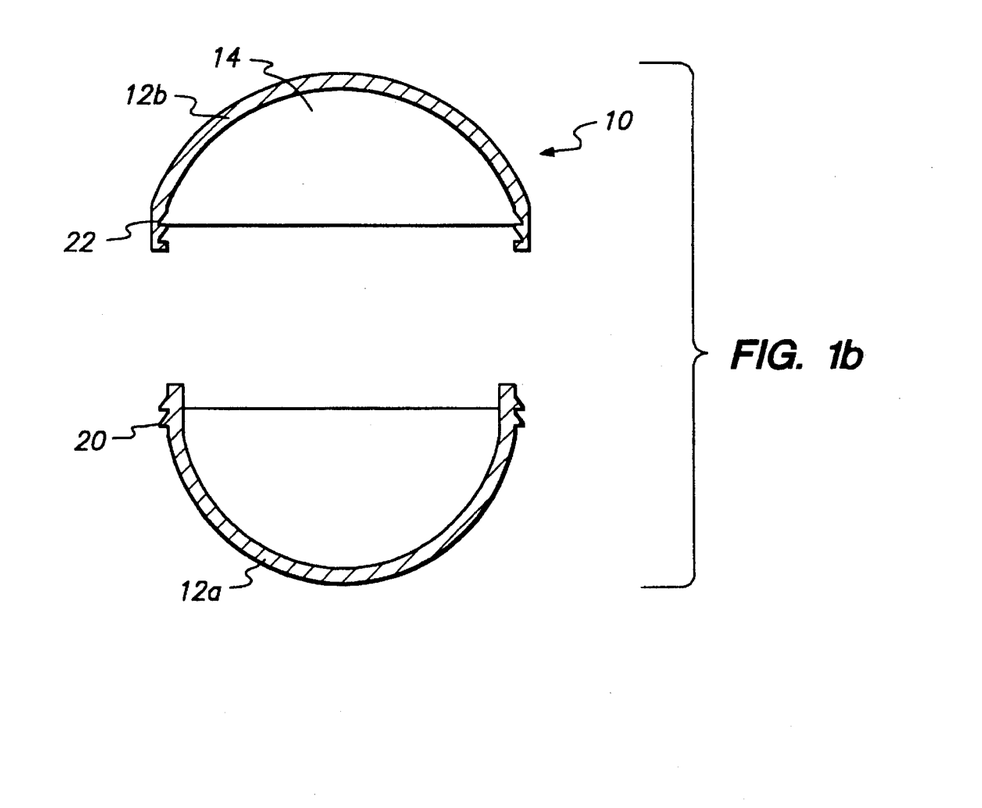

FIG. 1b shows the same closure in a transverse cross-sectional view, along line a–a', revealing features not visible in FIG. 1a. Shell 12a has tabs 20 adapted for interlocking with complementary tabs 22 in shell 12b, to hold the two shells snugly together. Although shells 12a and 12b have been depicted in a male-female relationship, other designs are permissible, for example a hermaphroditic design in which each shell has both tabs 20 and complementary tabs 22. Other mechanisms may be used for holding the shells together, for example a rail-and-channel construction, springs, or snap-latches.

Figure 1C:
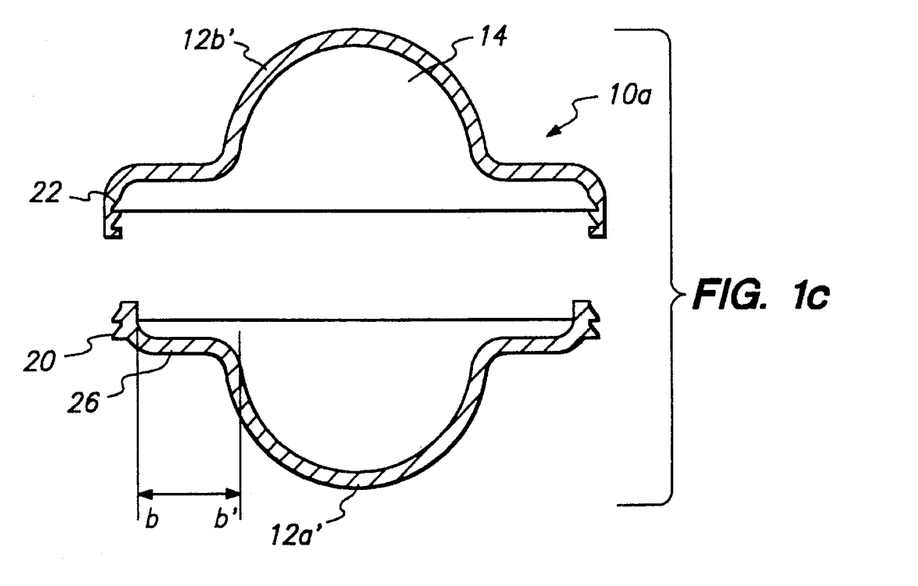
FIG. 1c and 1d show other closures of this invention respectively having flanges to provide an extended gel-to-gel interface and conductive gel nestingly positioned within the insulating gel.

The shells may have a transverse cross-sectional shape different from the substantially semi-circular one shown in FIG. 1b. FIG. 1c shows one such different embodiment, with like numerals referring to like elements. Closure 10a comprises shells 12a' and 12b', which have flanges 26 for extending the length of the interfacial bond between the insulating gels 14, as shown by dimension b–b' but otherwise may be identical to shells 12a and 12b of FIG. 1b. The increased interfacial bond length helps reduce the chance of a failure along the bond line between the insulating gels 14 filling shells 12a' and 12b'.

Figure 1D:
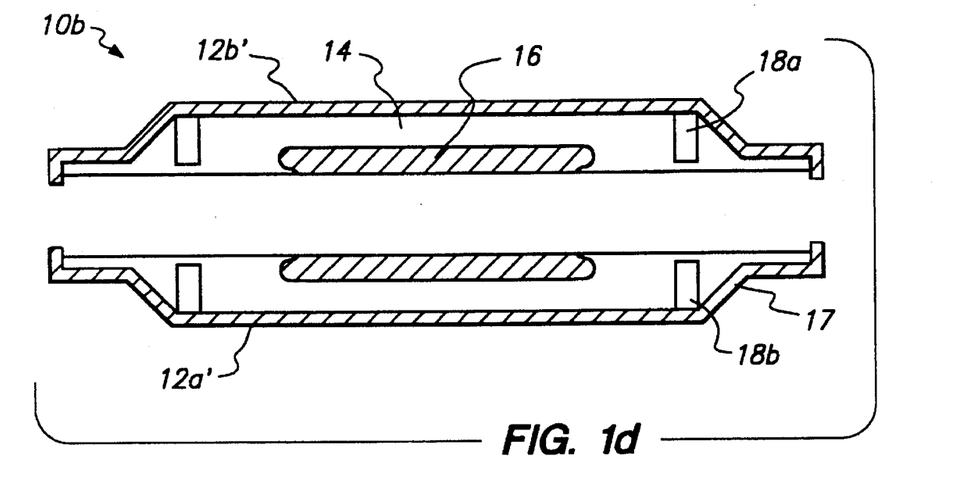

FIG. 1d (wherein numerals like those previously used denote like elements) shows yet another embodiment. Closure 10b is similar to closures 10 or 10a, but contains conductive gel 16 which is nestingly positioned within insulating gel 14, near the center of closure 10b, and is separated thereby from shells 12a–12b. Conductive gel 16 is an electrical stress control means which controls the distribution of electrical stress in the vicinity of the connection and exposed conductor. In this embodiment, the electrical stress control means and the insulating gel may be advantageously applied simultaneously with the positioning of the housing over the connection.

Figure 2:
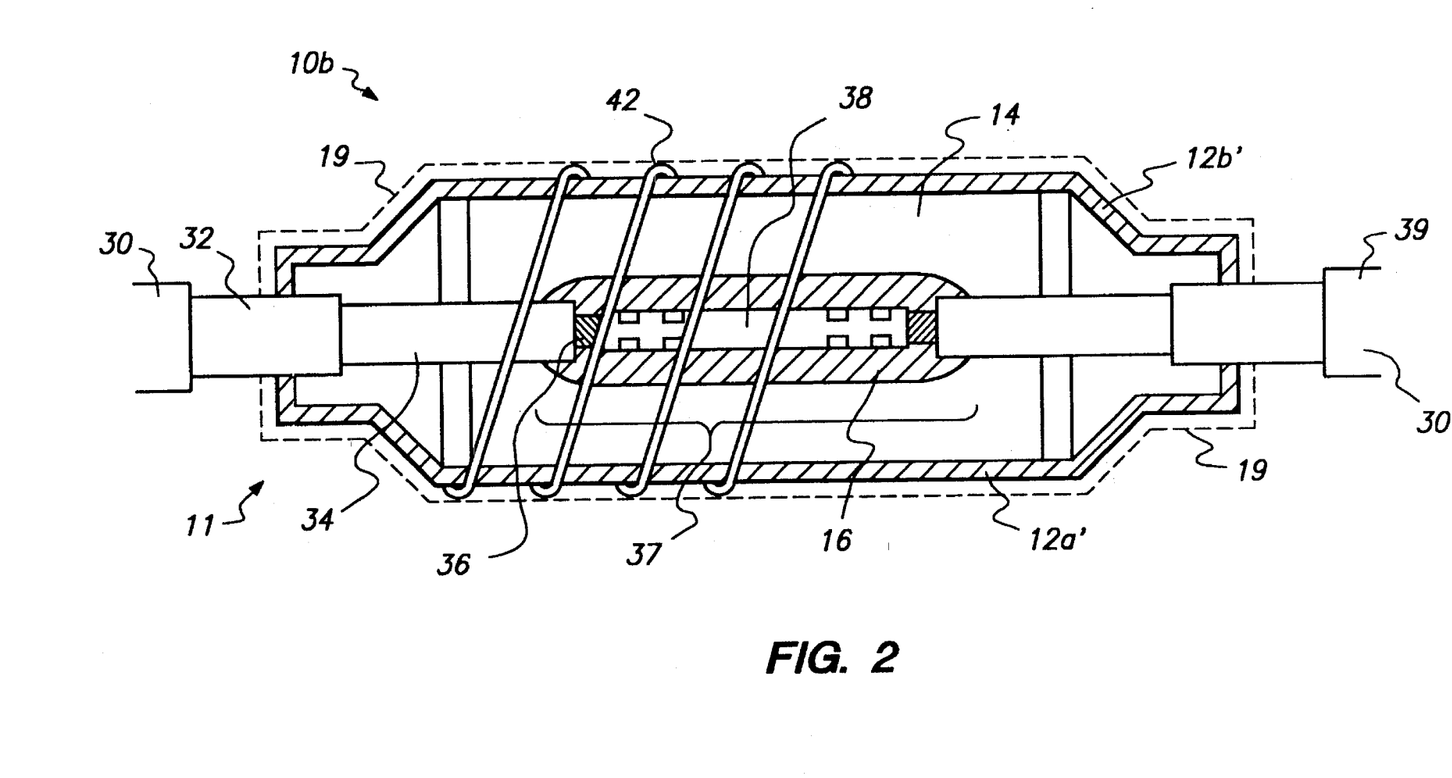
FIG. 2 shows the closure of FIG. 1c installed over an in-line connection between two high voltage cables.

FIG. 2 shows a partial longitudinal cross-section of closure 10b installed over a linear in-line connection between a pair of high voltage cables 30. Semiconducting layers 32 and insulations 34 of cables 30 have been stripped back in a terraced arrangement, to expose core conductors 36 which are joined by a crimp connector 38 to form a connection 37 therebetween. (Other connectors such as screw connectors may be used.) Cables 30 optionally have jackets 39, e.g., made of poly(vinyl chloride) ("PVC") or medium or high density polyethylene ("MDPE" and "HDPE," respectively), to provide additional mechanical and/or moisture barrier protection. Conductive gel 16 surrounds exposed core conductors 36, crimp connector 38, and the immediately adjacent portions of insulations 34. It equalizes the electric potential within its volume, i.e., acts as a Faraday cage, preventing the development of electrical stresses which could lead to failure. Shells 12a and 12b have been mated together to form a housing 11 which contains connection 37. Stress cone 17 provides stress relief at the junction of the strip-backs of the insulations 34 and semiconductive layers 32. Conductive surface 19 may be electrically connected to semiconducting layers 32 to provide an electrically neutral outer surface for the joint. Spring 42 holds shells 12a and 12b together, to provide a hermetic seal therebetween. Spring 42 also maintains gel material 14 under compression, increasing its effectiveness as a void-filling and sealing material. Where shells 12a and 12b are made of a resilient material, the forces exerted by interlocking tabs 20 and 22 in holding shells 12a and 12b together may be sufficient to hold insulating gel 14 under compression. Other means of applying a compressive force on the gel, for example a volume of compressed gas, or an elastomeric bag around the completed joint may be employed, as disclosed in Hawkins et al., U.S. Pat. No. 4,736,071 (1988), the disclosure of which is incorporated herein by reference.

Instead of using a stress cone 17 for providing stress relief, one may use a stress grading material (not shown), typically a tape or mastic having a resistivity in the $10^7$ to $10^{11}$ ohm-cm range. The stress grading material is wrapped or otherwise positioned at the semiconductive termini, i.e., where the semiconductive layer and the insulation strip-backs meet.

Insulating gel 14 preferably has a cone penetration value between about 50 and about 350 ($10^{-1}$ mm), and more preferably between 250 and 350; and preferably an ultimate elongation of at least approximately 100%, more preferably at least 200%. Where re-enterability is a consideration, the gel should have a cohesive strength greater than the adhesive strength of an exposed surface of the gel to itself or a similar gel. Cone penetration may be chosen to ensure that the insulating gel is able to be deformed around the conductors to be sealed to avoid air voids, but without excessive flow or if desired excessive relaxation over time. The ultimate elongation may be chosen to ensure that upon re-entry into the closure, the insulating gel is pulled away from the shielded cable joint by parting the two shells. Cone penetration is measured by ASTM D217-68 at 21° C. on an undisturbed sample using a standard 1:1 scale cone (cone weight 102.5 g, shaft weight 47.5 g), the penetration being measured after 5 sec. Elongation is measured by ASTM D638-80 at 21° C. using a Type 4 die to cut the sample and pulling at a speed of 50 cm/min. The gel should be substantially inert towards the materials of the joint and the cables joined. The insulating gel desirably has the following electrical properties: a volume resistivity of at least $10^{12}$, preferably at least $10^{14}$, and more preferably at least $10^{16}$ ohm-cm; a dielectric constant of less than 5; a dissipation factor of less than 0.01; and a bulk dielectric strength of at least 20 kV/mm. Because high voltage equipment has to function at elevated temperatures, for example at a continuous operating temperature of 90°±5° C. with emergency excursions up to 130°±5° C., the gel must have good high temperature resistance. Preferably insulating gel 14 has a void filling capability such that the void content inside the joint is within the limits set by standard AEIC-CS5-87.

Insulating gels may be made by gelling curable polyurethane precursors in the presence of mineral oil, a vegetable oil, or a plasticizer or mixture thereof. The amount of plasticizer may be, for example, 30–70% by weight of the total in the case of a plasticizer such as trimellitate, or 60–80% in the case of a vegetable or mineral oil. Mineral and vegetable oils may be mixed, for example in the ratio 0.7–2.4 parts by weight of mineral oil to 1 part by weight of vegetable oil. Other suitable insulating gels may be made by curing reactive silicones with non-reactive, extender silicones. A further class of insulating gels comprises those formed by extending triblock copolymers, such as styrene-ethylene-butylene-styrene copolymers (available under the trademark Kraton™ by Shell Oil Co.) Illustrative disclosures of gels which may be suitable include Debbault, U.S. Pat. No. 4,600,261 (1986); Dubrow et al., U.S. Pat. No. 5,079,300 (1992); Rinde et al., U.S. Pat. No. 5,104,930 (1992); Gamarra, U.S. Pat. No. 5,149,736 (1992); Sutherland, WO 90/05166 (1990); and Sutherland et al., WO 91/05014 (1991); the disclosures of which are incorporated herein by reference.

The insulating gel also forms a high dielectric strength interface with other materials such as the electrical stress distribution means and the cable insulation and semiconducting layer. As a result, these interfaces do not have to be as long as in prior art closures to protect against failure along them, permitting an overall shorter joint.

The insulating gel should be compatible with the cable materials, i.e., does not attack them. It is known that XLPE and other hydrocarbon based cable materials are susceptible to attack by mineral oil; if so, mineral oil-based gels should be avoided with such cables. Silicone gels are preferred, because of their high temperature resistance, superior electrical properties, compatibility with cable materials, and chemical inertness.

We have unexpectedly discovered that the interface between insulating gels has a very high interfacial dielectric strength. Normally the interfacial dielectric strength between two pieces of the same material is only a small fraction of the bulk dielectric strength of the material itself. For example, with EPDM rubber, the bulk dielectric strength is about 18.2 kV/mm. But the interfacial dielectric strength is about one-sixth that, or about 3 kV/mm, the exact value being dependent on the pressure exerted at the time of measurement. A high voltage joint case containing an EPDM-EPDM interface would be highly susceptible to failure along the interface. In contrast, we have found that the gel-gel interfacial dielectric strength is at least 40%, typically at least 60%, and often at least 80% of the bulk dielectric strength. In the specific instance of a preferred silicone gel, the bulk dielectric strength is about 25 kV/mm. The interfacial dielectric strength is a surprisingly high 20 kV/mm, or about 80% of the bulk value. With such a high interfacial dielectric strength, a joint may contain a gel-gel interface without being unduly susceptible to failure along the interface.

The dielectric strength of an EPDM-EPDM interface may be temporarily improved by applying a layer of grease thereto. However, the grease migrates when the joint is subject to thermal stresses, eventually leading to a low dielectric strength interface which fails. With a gel-gel interface, the interfacial dielectric strength remains high indefinitely, so that the interface does not become over time a "weak link" via which failure can occur.

Conductive gel 16 serves as an electrical stress control means. It helps eliminate the effect of ionizable voids by creating a field of equal voltage potential around such voids (the Faraday cage effect). The non-electrical properties of conductive gel 16 generally may be the same as those of insulating gel 14. Conductive gel 16 may be made by the inclusion, in an otherwise non-conductive gel, of a conductive material such as carbon black; graphite; fine particles or flakes of a metal such as nickel, cobalt, gold, or silver; or an intrinsically conductive polymer such as polypyrrole, polyaniline, polythiophene, polyanisidine, and the like. Conductive gels which may be suitable are disclosed in Rowlette, U.S. Pat. No. 4,770,641 (1988); Nakanishi, U.S. Pat. No. 4,845,457 (1989); Joyce, Jr. et al., U.S. Pat. No. 5,182,050; and Toy et al., WO 86/01634 (1986); the disclosures of which are incorporated by reference. The resistivity of conductive gel 16 preferably is less than 500 ohm-cm and is typically between 100 and 1000 ohm-cm. Conductive gel 16 preferably is constituted of the same base material as insulating gel 14, to ensure good adhesion between the two. It is also preferably a silicone gel. Compatibility with the cable or connection materials with which it comes into contact is of course required.

A roll spring, perforated aluminum sheet, conforming conductive foam, or a conductive tape or flexible layer may be used instead of conductive gel 16 to provide a Faraday cage. These alternative means may be pre-positioned onto insulating gel 14 or may be applied in a separate step, for example in wrapping a conductive tape around the conductors and/or connector.

The electrical stress control means may control the distribution of electrical stress by other than a Faraday cage effect. It may be a high permittivity material, such as a tape or mastic made from a lightly carbon black-filled butyl rubber or other polymer, or a gel having a resistivity in this latter range, which is positioned around the connection to distribute the electrical stresses more evenly.

A force means (such as spring 42) may be used in combination with shells 12a and 12b to force insulating gel 14 into close and conforming contact with conductive gel 16 or other stress control means, the portions of the cables contained within the housing, and with the insulating gel in the other shell. (Connection 37 is surrounded by conducting gel 16 and therefore does not contact insulating gel 14.) Substantially all the voids inside the housing are filled. Dielectrically strong interfaces are formed between insulating gel 14 and all the materials it contacts, including other gel material. Preferably, the force means further acts in combination with the shells to maintain the insulating gel under compression during service. During service, the insulating gel may be subject to a number of mechanical or thermal stresses during thermal cycling of the cable or movement of the earth in which it may be buried. Such stresses tend to disbond the insulating gel from the joint or to part the gel-to-gel the interface. Maintaining the insulating gel under compression helps prevent such disbonding. The compressive force required is not large, and in fact may be quite small. Where the mechanical and thermal stresses are not particularly severe or where the housing adequately protects the insulating gel from such stresses, its maintenance under compression is not essential. Where the only force required is for forcing the insulating gel into the close, conforming contact with the connection and the portions of cables contained within the housing, such force may be simply the manual pressure exerted in mating shells 12a and 12b together. Spring 42 may be a roll spring, a constant pressure wire coil spring, a pair of half springs, and the like. Other force means may include clamps, latches, and the like.

Figure 3:
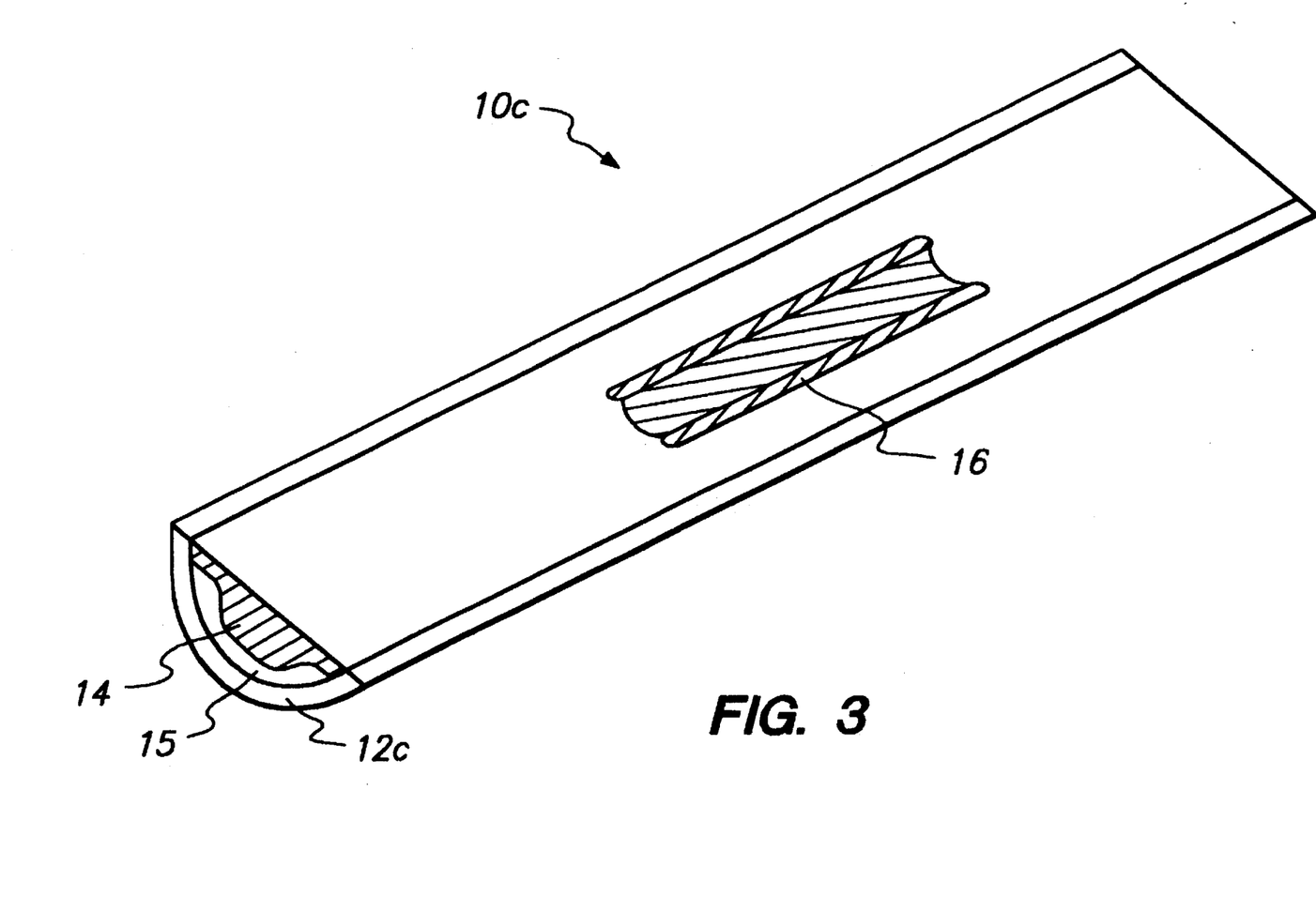
FIG. 3 shows another closure of this invention having an additional insulation layer.
Figure 4:
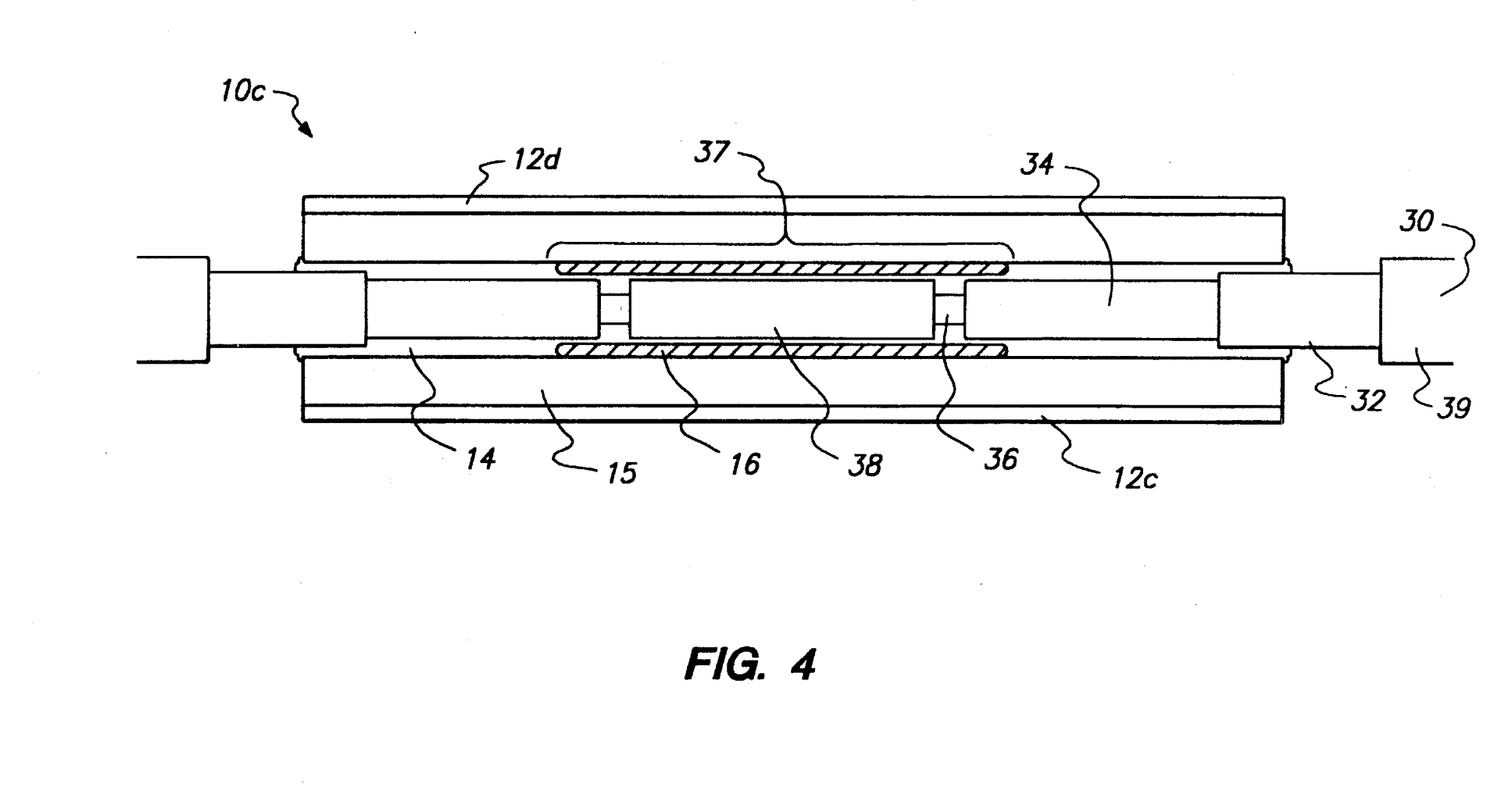
FIG. 4 shows such closure installed over a high voltage cable connection.

FIG. 3 shows an alternative closure 10c of this invention (numerals identical to those used in the previous figures referring to like elements). Closure 10c comprises first and second elongate shells 12c and 12d (with only 12c being shown for convenience, as the two are substantially the same). Closure 10c differs from closure 10 in that it contains a layer 15 of insulating material (e.g., made of a thermoplastic such as HDPE or rubber) which is disposed between shell 12c and insulating gel 14, separating the latter from each other except along their interior longitudinal edges. Optional conductive gel 16 is also shown. This design is advantageous because it reduces the amount of insulating gel 14 used, which in the case of the preferred silicone gels, may be quite expensive. At the center, where the closure fits over a connection and the electrical stresses are most severe, insulation is still provided by insulating gel 14, so that performance is not compromised because of the insulating gel's ability to effectively encapsulate the connection and form dielectrically strong interfaces. Also, the interface leading from the connection area to the edges of shell 12c are all gel-gel interfaces, which are dielectrically strong. Shell 12c and layer 15 may be simultaneously formed, in a co-extrusion step. Typically, shell 12c is about 3 mm thick, while layer 15 should have a dielectric constant of less than 5 and a resistivity of greater than $10^{12}$ ohm-cm and is between about 5 and about 7 mm thick. FIG. 4 shows closure 10c of FIG. 3 installed over a high voltage cable connection, with numerals repeated from prior figures referring to like elements.

Figure 5A:
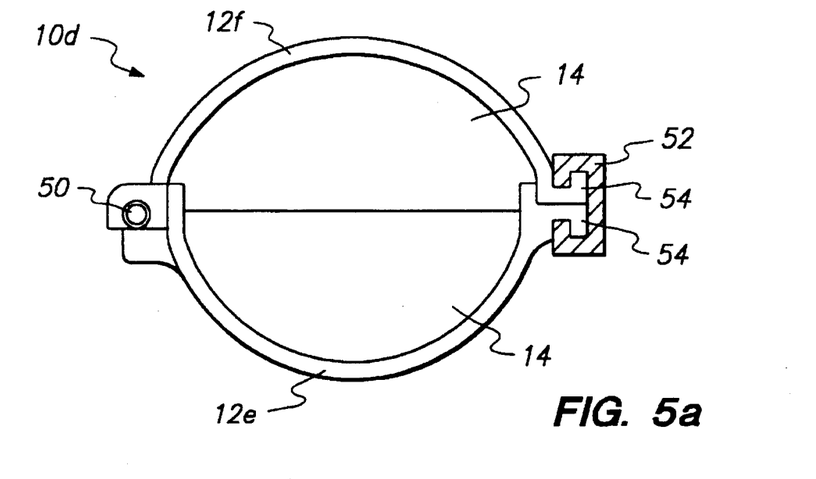
FIG. 5a shows the embodiment in which two half-shells are joined at a hinge.

FIG. 5a shows in a radial cross-section another closure 10d of this invention, wherein shells 12e and 12f, filled with insulating gel 14, are connected to each other via a longitudinal hinge 50. A secure closure is effected by abutting the edges of rails 54 and sliding a channel 52 thereover, for example as disclosed in Ellis, U.S. Pat. No. 3,455,336 (1969). Other closure mechanisms, for example latches or clamps positioned at intervals long the longitudinal edge opposite from hinge 50, may also be used.

Figure 5B:
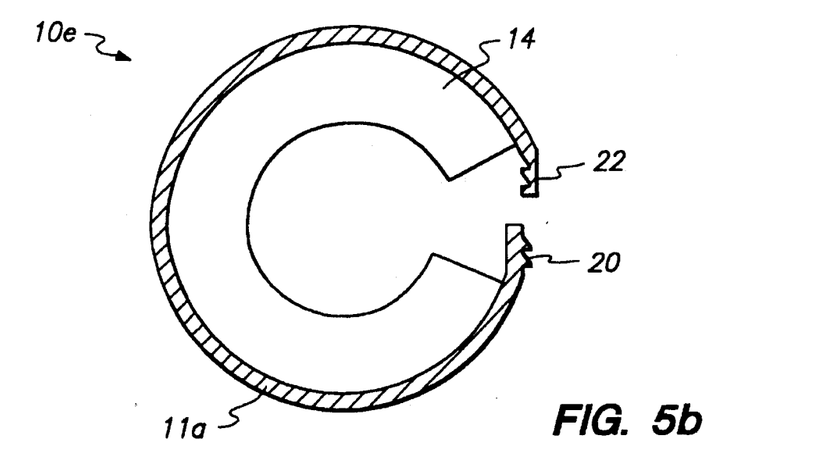
FIG. 5b shows yet another alternative embodiment in which a single-piece, wrap-around housing is used.

FIG. 5b shows in a radial cross-section another closure 10e, comprising a single-piece, wraparound housing 11a.

Housing 11a is filled with an insulating gel 14. Closure is effected via interlocking tabs 20 and 22. Alternatively, closure may be effected by a rail-and-channel mechanism as shown in FIG. 5a. It is noted that in this instance, when the closure is installed over a connection, the insulating gel-to-insulating gel interface is not between two different bodies of gel, but between two different portions of a contiguous body of gel.

Figure 5C:
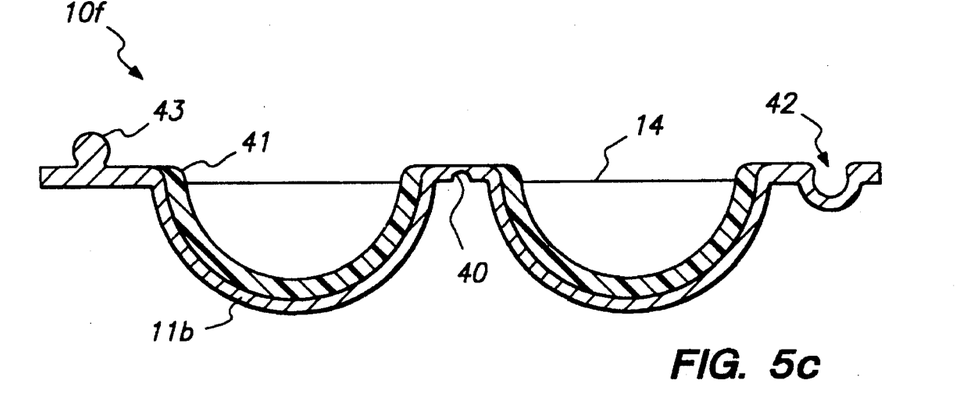
FIG. 5c shows yet another hinged embodiment.

FIG. 5c shows yet another single-piece, wrap-around closure 10f, in a radial cross-section view. Housing 11b is made of a relatively flexible polymeric material, such as HDPE, modified with carbon black or other conductive material to make it conductive. Compositely molded therewith is a layer 41 of rigid insulating plastic, to provide primary insulation and crush resistance. Integrally molded into housing 11b is a hinge 40 and a locking mechanism in the form of a cylindrical ridge 43 which can be lockably engaged with groove 42.

Figure 6:
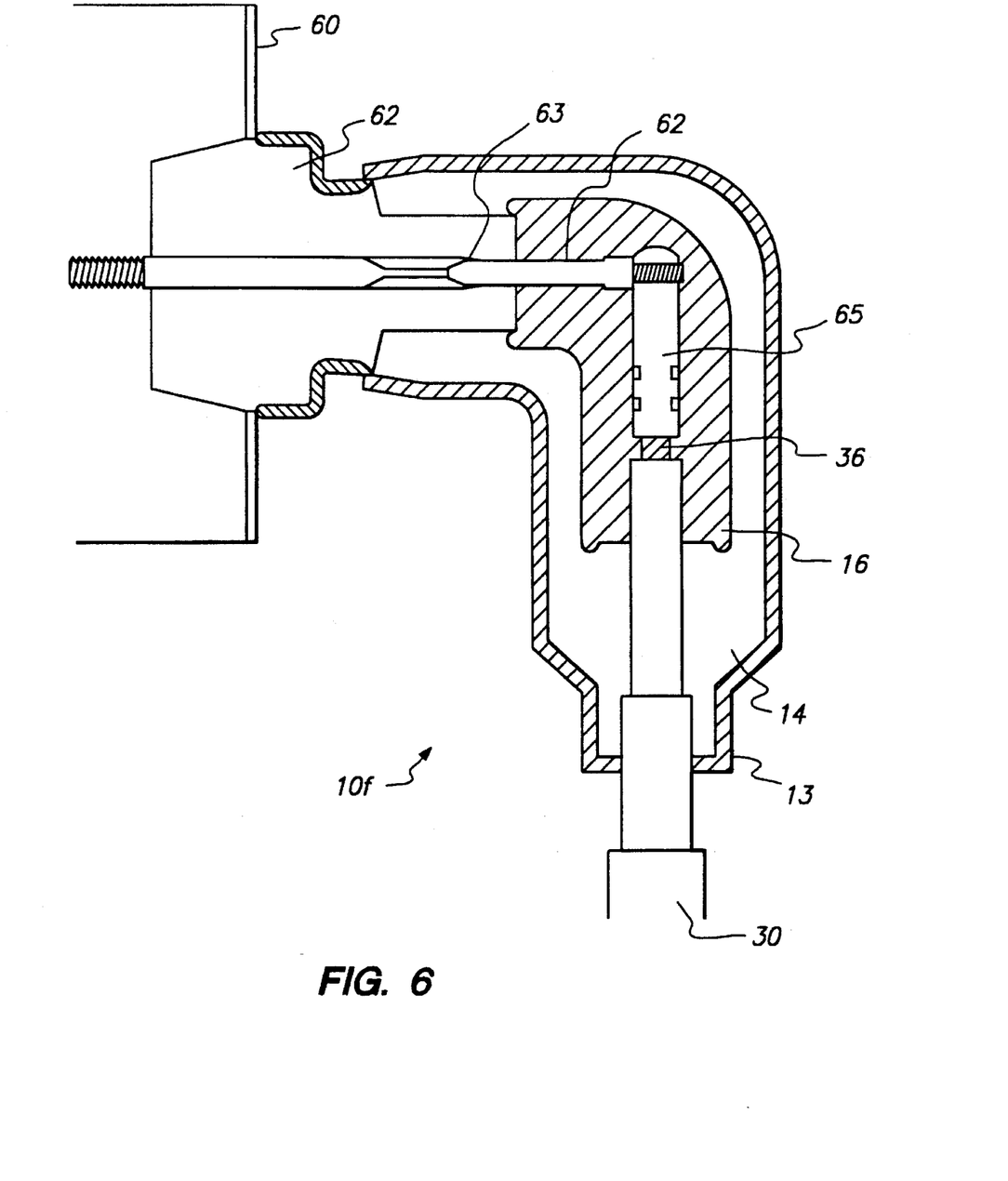
FIG. 6 shows an elbow connection protected by a closure according to this invention.

FIG. 6 shows in cross section an L-shaped, or elbow closure 10f of this invention connecting a cable 30 to another electrical equipment 60 which may be a transformer or switch gear. Two half-shells 13 can be fitted together to form closure 10f. Each half-shell 13 is at least partially filled with insulating gel 14. Optional conductive gel 16 is positioned near the elbow area, where the connection itself will be formed, to provide electrical stress control. Connector 65 connects conductor 36 to bushing 62 of equipment 60 via a pin 62a which fits into socket 63. Those skilled in the art will appreciate that other configurational variations, such as T-shaped closures are within the scope of this invention.

Figure 7A:
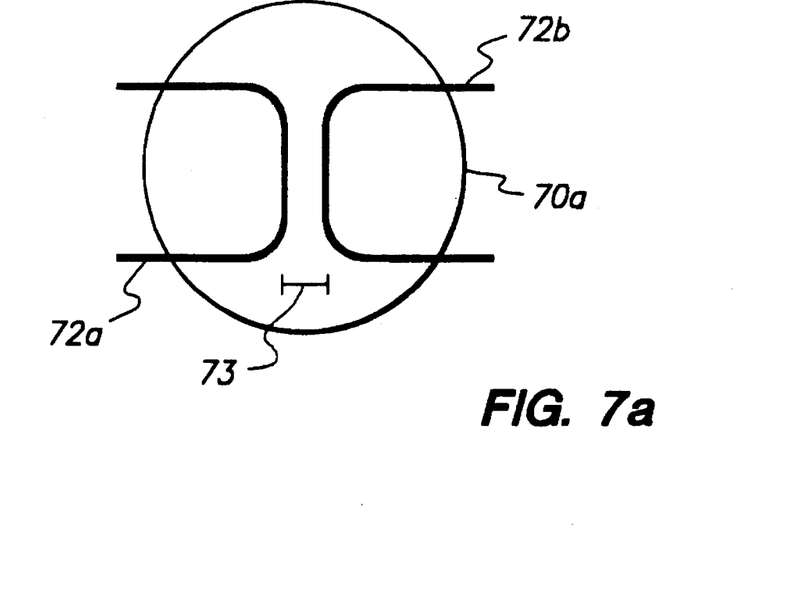
FIG. 7a–b show a set-up for measuring interfacial dielectric strengths.
Figure 7B:
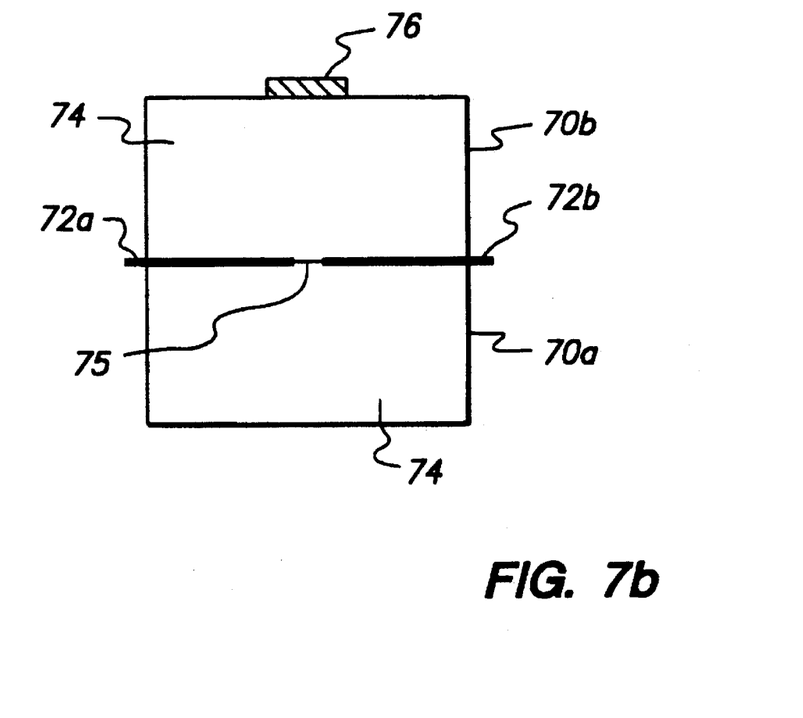

FIG. 7a and 7b show a set-up for measuring interfacial dielectric strength, with FIG. 7a showing a top view and FIG. 7b showing a cross-sectional side view. A shallow round dish 70a has two U-shaped 2 mm diameter copper wires 72a and 72b mounted thereon, with the bottoms of the U's facing each other and spaced apart with a separation 73 which is typically 1, 2, or 3 min. A first gel material 74a is poured into dish 70a, until gel material 74a is level with but does not cover wires 72a and 72b. Meanwhile, another dish 70b is also filled with gel material 74a. The gel materials 74a in each dish are permitted to set. Dish 70b is inverted and placed over dish 70a, so that the gel materials 74a in each dish meet and form an interface 75. A slight pressure is applied with a weight 76, typically about 200 g. An increasing voltage is applied across wires 72a and 72b, until a breakdown occurs. Knowing the separation 73, the interfacial dielectric strength in V/mm may be calculated. The corresponding bulk dielectric strength may be found by filling dish 70a with gel material 74a until wires 72a and 72b are entirely covered and then measuring as before.

The gel-gel interface of the present invention is advantageous not just because of its high interfacial dielectric strength. The interface is easily formed in a substantially void-free manner upon the application of minimal pressure or even upon simple contact, with a dielectric strength which is not appreciably decreased by the removal of the application force. Because of the conformability of the insulating gel, very closely complementary topology between the opposing surfaces is not required. The interface resists disbonding when subjected to vibrations or other minor movements of the joint.

Those skilled in the art will appreciate that the closure of this invention has been primarily described herein as comprising an one-piece housing or two shells which mate to form the housing as a matter of convenience and that combinations of some other number of shells, for example three or four or even more mating shells, may be used.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A closure arrangement for protecting a connection between two pieces of high voltage electrical equipment, comprising
   (a) a housing for fitting over the connection and having a conductive surface for providing an electrically neutral shield for the connection and the portions of the electrical equipment contained therein;
   (b) electrical stress control means for surrounding the connection and the portions of the electrical equipment immediately adjacent thereto, to control the distribution of electrical stress; and
   (c) an insulating gel adheringly disposed within the housing inside of the conductive surface and for making close and conforming contact with the electrical stress control means and the portions of the electrical equipment contained within the housing such that substantially all voids therewithin which are not surrounded by the electrical stress control means are filled when the housing is fitted over the connection and the insulating gel forms at least one gel-to-gel interface with other insulating gel, the interface having an interfacial dielectric strength of at least 40% of the bulk dielectric strength of the insulating gel.

2. A closure arrangement according to claim 1, wherein the housing comprises at least two shells adapted to fitting together to form the housing.

3. A closure arrangement according to claim 2, wherein the shells have an insulating layer disposed between the shell and the insulating gel.

4. A closure arrangement according to claim 2, wherein the shells are two in number and are connected to each other via a longitudinal hinge.

5. A closure arrangement according to claim 2, wherein each shell has flanges along its longitudinal edge, for extending the length of the interfacial bond between the insulating gel of one shell and the insulating gel of another shell.

6. A closure arrangement according to claim 1, further comprising a force means for acting in combination with the housing for forcing the insulating gel into close and conforming contact with the electrical stress control means, the portions of the electrical equipment contained within the housing, and other insulating gel.

7. A closure arrangement according to claim 6, wherein the force means further acts in combination with the housing to maintain the insulating gel under compression during service.

8. A closure arrangement according to claim 6, wherein the housing comprises at least two shells adapted to fitting together to form the housing.

9. A closure arrangement according to claim 8, wherein the force means further acts in combination with the housing to maintain the insulating gel under compression during service.

10. A closure arrangement according to claim 1, wherein the insulating gel is a silicone gel.

11. A closure arrangement according to claim 1, wherein the electrical stress control means is a conductive gel.

12. A closure arrangement according to claim 11, wherein the insulating gel and the conductive gel both are silicone gels.

13. A closure arrangement according to claim 1, wherein at least one of the pieces of electrical equipment is a high voltage power cable.

14. A closure arrangement according to claim 13, wherein both pieces of high voltage electrical equipment are high voltage power cables.

15. A closure arrangement according to claim 14, wherein the housing comprises at least two shells adapted to fitting together to form the housing.

16. A closure arrangement according to claim 1, wherein one of the pieces of high voltage electrical equipment is a high voltage power cable and the other piece is switch gear or a transformer.

17. A closure according to claim 1, wherein the housing is made of an elastomeric material, to accommodate thermal expansion of the insulating gel.

18. A closure according to claim 1, wherein the housing further comprises a spacer means for ensuring that the insulating gel is distributed around the connection in a minimum predetermined thickness.

19. A closure according to claim 1, wherein the at least one gel-to-gel interface has an interfacial dielectric strength of at least 60% of the bulk dielectric strength of the insulating gel.

20. A closure according to claim 1, wherein the at least one gel-to-gel interface has an interfacial dielectric strength of at least 80% of the bulk dielectric strength of the insulating gel.

21. A joint between a high voltage power cable and other electrical equipment, the cable comprising at least one core conductor, an insulation surrounding each core conductor, and a semiconducting layer surrounding the insulated core conductors, wherein
   (a) a connection is formed between an exposed conductor of a stripped core of the cable and an exposed conductor of the other electrical equipment by means of a connector;
   (b) an electrical stress control means surrounds the connection and the portions of the cable and the other electrical equipment immediately adjacent thereto to control the distribution of electrical stress;
   (c) a housing encompasses the connection and electrical stress control means, the housing having a conductive surface which is electrically connected to the semiconducting layers of the cable and the other electrical equipment to provide an electrically neutral shield for the joint; and
   (d) the interior of the housing is filled with at least an insulating gel which forms at least one gel-to-gel interface with other insulating gel, the interface having an interfacial dielectric strength of at least 40% of the bulk dielectric strength of the insulating gel and the insulating gel being disposed within the electrically neutral shield and in close and conforming contact with the interior of the housing, the electrical stress control means and the portions of the cable and the other electrical equipment contained within the housing.

22. A joint according to claim 21, wherein the housing comprises at least two shells which fit together to form the housing.

23. A joint according to claim 22, wherein the shells have an insulating layer disposed between the shell and the insulating gel.

24. A joint according to claim 22, wherein the shells are two in number and are connected to each other via a longitudinal hinge.

25. A joint according to claim 22, wherein each shell has flanges along its longitudinal edge, for extending the length of the interfacial bond between the insulating gel of one shell and the insulating gel of another shell.

26. A joint according to claim 21, further comprising a force means for acting in combination with the housing for forcing the insulating gel into close and conforming contact with the electrical stress control means, the portions of the cable and other electrical equipment contained within the housing, and other insulating gel.

27. A joint according to claim 26, wherein the force means further acts in combination with the housing to maintain the insulating gel under compression during service.

28. A joint according to claim 21 wherein the insulating gel is a silicone gel.

29. A joint according to claim 21, wherein the electrical stress control means is a conductive gel.

30. A joint according to claim 29, wherein the insulating gel and the conductive gel both are silicone gels.

31. A joint according to claim 21, wherein the other electrical equipment also is a high voltage power cable.

32. A joint according to claim 21, wherein the other electrical equipment is switch gear or a transformer.

33. A joint according to claim 21, wherein the housing is made of an elastomeric material, to accommodate thermal expansion of the insulating gel.

34. A joint according to claim 21, wherein the housing further comprises a spacer means for ensuring that the insulating gel is distributed around the connection in a minimum predetermined thickness.

35. A joint according to claim 21, wherein the at least one gel-to-gel interface has an interfacial dielectric strength of at least 60% of the bulk dielectric strength of the insulating gel.

36. A joint according to claim 21, wherein the at least one gel-to-gel interface has an interfacial dielectric strength of at least 80% of the bulk dielectric strength of the insulating gel.

37. A method of making a joint between a high voltage cable and other electrical equipment, the cable comprising at least one core conductor, an insulation surrounding each core conductor, and a semiconducting layer surrounding the insulated core conductors, comprising the steps of:

(a) stripping back the semiconducting layer and the insulation of the cable in a terraced arrangement to expose a portion of the insulation and the conductor;

(b) forming a connection between the exposed cable conductor and an exposed conductor of the other electrical equipment with a connector;

(c) surrounding the connection and the portions of the cable and the other electrical equipment immediately adjacent thereto with an electrical stress control means to control the distribution of electrical stress; and (d) positioning over the connector a housing having a conductive surface and further having an insulating gel adheringly disposed on the interior thereof inside of the conductive layer, such that the insulating gel is in close and conforming contact with the electrical stress control means and the insulating gel forms at least one gel-to-gel interface with other insulating gel, the interface having an interfacial dielectric strength of at least 40% of the bulk dielectric strength of the insulating gel and the portions of the electrical equipment within the housing; substantially all voids within the housing which are not surrounded by the electrical stress control means are filled; and the conductive surface forms an electrically neutral shield for the connection.

38. A method according to claim 37, wherein the housing comprises at least two shells which fit together to form the housing.

39. A method according to claim 38, wherein the shells have an insulating layer disposed between the shell and the insulating gel.

40. A method according to claim 38, wherein the shells are two in number and are connected to each other via a longitudinal hinge.

41. A method according to claim 38, wherein each shell has flanges along its longitudinal edge, for extending the length of the interfacial bond between the insulating gel of one shell and the insulating gel of another shell.

42. A method according to claim 37, wherein a force means acts in combination with the housing for forcing the insulating gel into close and conforming contact with the electrical stress control means, the portions of the cable and other electrical equipment contained within the housing, and other insulating gel.

43. A method according to claim 42, wherein the force means further acts in combination with the housing to maintain the insulating gel under compression during service.

44. A method according to claim 37, wherein the insulating gel is a silicone gel.

45. A method according to claim 37, wherein the electrical stress control means is a conductive gel.

46. A method according to claim 45, wherein the insulating gel and the conductive gel both are silicone gels.

47. A method according to claim 37, wherein the other electrical equipment also is a high voltage power cable.

48. A method according to claim 37, wherein the other electrical equipment is switch gear or a transformer.

49. A method according to claim 37, wherein the housing is made of an elastomeric material, to accommodate thermal expansion of the insulating gel.

50. A method according to claim 37, wherein the housing further comprises a spacer means for ensuring that the insulating gel is distributed around the connection in a minimum predetermined thickness.

51. A method according to claim 37, wherein the at least one gel-to-gel interface has an interfacial dielectric strength of at least 60% of the bulk dielectric strength of the insulating gel.

52. A method according to claim 37, wherein the at least one gel-to-gel interface has an interfacial dielectric strength of at least 80% of the bulk dielectric strength of the insulating gel.

* * * * *